(12) United States Patent
Lambrechts

(10) Patent No.: US 9,045,901 B2
(45) Date of Patent: *Jun. 2, 2015

(54) HIGH ELONGATION FIBRE WITH GOOD ANCHORAGE

(75) Inventor: Ann Lambrechts, Avelgem (BE)

(73) Assignee: NV BEKAERT SA, Zwevegem (BE)

( * ) Notice: Subject to any disclaimer, the term of this patent is extended or adjusted under 35 U.S.C. 154(b) by 504 days.

This patent is subject to a terminal disclaimer.

(21) Appl. No.: 13/377,326

(22) PCT Filed: Jun. 14, 2010

(86) PCT No.: PCT/EP2010/058295
§ 371 (c)(1), (2), (4) Date: Dec. 9, 2011

(87) PCT Pub. No.: WO2010/142808
PCT Pub. Date: Dec. 16, 2010

(65) Prior Publication Data
US 2012/0097073 A1 Apr. 26, 2012

(30) Foreign Application Priority Data
Jun. 12, 2009 (EP) ...................................... 09162571

(51) Int. Cl.
*C04B 14/48* (2006.01)
*E04C 5/03* (2006.01)
*E04C 5/01* (2006.01)

(52) U.S. Cl.
CPC ........... *E04C 5/012* (2013.01); *Y10T 428/2976* (2013.01); *C04B 14/48* (2013.01)

(58) Field of Classification Search
None
See application file for complete search history.

(56) References Cited

U.S. PATENT DOCUMENTS

| 2,677,955 A | 5/1954 | Constantinesco |
| 3,852,930 A | 12/1974 | Naaman |
| 3,900,667 A | 8/1975 | Moens |

(Continued)

FOREIGN PATENT DOCUMENTS

| DE | 92 07 598 U1 | 10/1992 |
| DE | 43 15 270 A1 | 11/1993 |

(Continued)

OTHER PUBLICATIONS

USPTO Office Action, U.S. Appl. No. 13/377,288, Dec. 5, 2013, 6 pages.

(Continued)

*Primary Examiner* — John J Zimmerman
(74) *Attorney, Agent, or Firm* — Foley & Lardner LLP

(57) ABSTRACT

The invention relates to a steel fibre for reinforcing concrete or mortar. The fibre has a middle portion and anchorage ends. The middle portion has a maximum load capacity $F_m$ and an elongation at maximum load $A_{g+e}$. The elongation at maximum load $A_{g+e}$ is at least 2.5%. The steel fibre has an anchorage force in said concrete or said mortar of at least 90% of the maximum load capacity $F_m$. The anchorage force is the maximum load obtained during a pull out test of a steel fibre embedded with one of the anchorage ends in the concrete or the mortar. The steel fibre has the advantage that it can be used at normal dosages in load carrying structures of concrete.

12 Claims, 5 Drawing Sheets

(56) References Cited

U.S. PATENT DOCUMENTS

Figure 1:
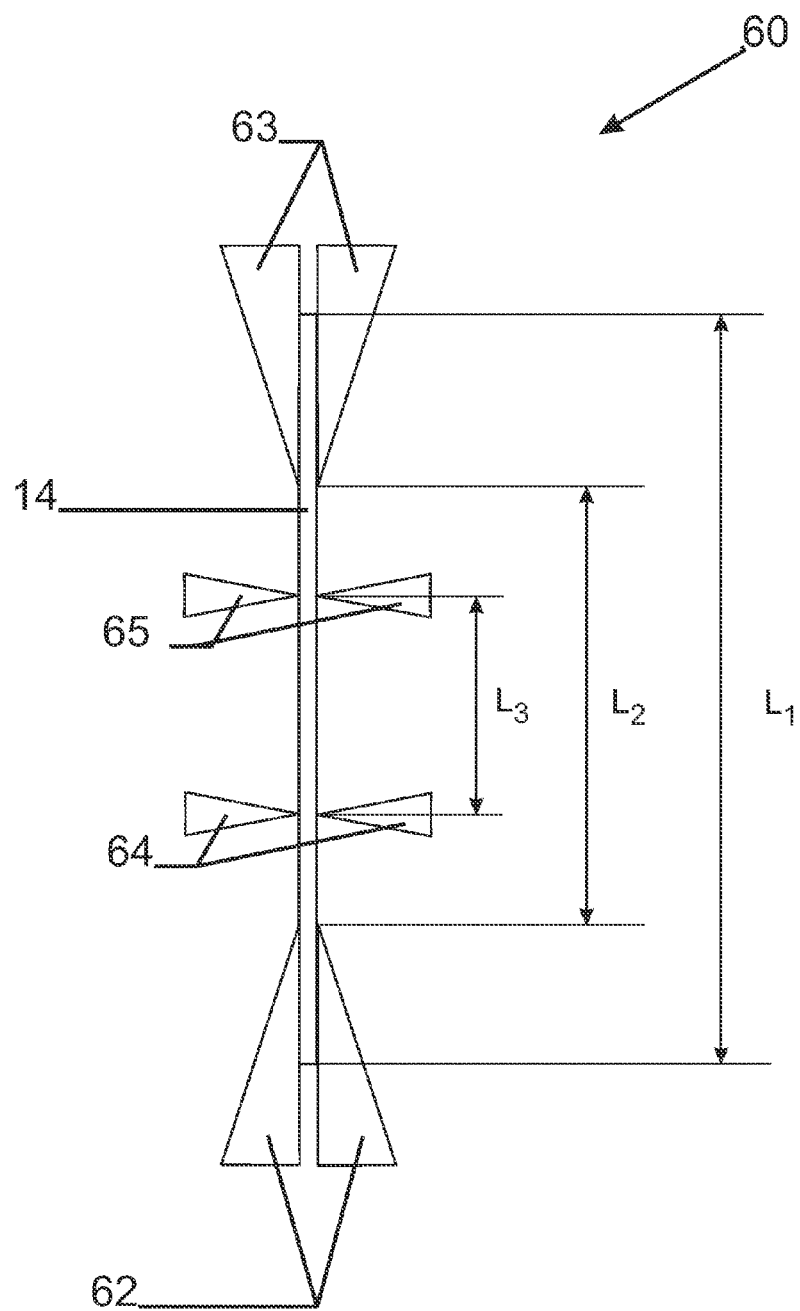

| | | | |
|---|---|---|---|
| 3,942,955 A * | 3/1976 | Moens | 428/595 |
| 3,953,953 A | 5/1976 | Marsden | |
| 4,159,911 A | 7/1979 | Takazuka | |
| 4,224,377 A * | 9/1980 | Moens | 428/369 |
| 4,233,364 A | 11/1980 | Van Thiel | |
| 4,284,667 A | 8/1981 | Moens | |
| 4,298,660 A | 11/1981 | Nakagawa | |
| 4,513,040 A | 4/1985 | Lankard | |
| 4,559,276 A | 12/1985 | Tezuka | |
| 4,560,622 A | 12/1985 | Tezuka et al. | |
| 4,585,487 A | 4/1986 | Destree et al. | |
| 4,764,488 A | 8/1988 | Saito et al. | |
| 4,804,585 A | 2/1989 | Tani et al. | |
| 4,883,713 A | 11/1989 | Destree et al. | |
| 4,960,649 A | 10/1990 | Takata et al. | |
| 5,215,830 A | 6/1993 | Cinti | |
| 5,359,873 A | 11/1994 | Grondziel | |
| 5,443,918 A * | 8/1995 | Banthia et al. | 428/603 |
| 5,503,670 A | 4/1996 | Richard et al. | |
| 5,858,082 A | 1/1999 | Cruz et al. | |
| 5,965,277 A | 10/1999 | Banthia et al. | |
| 6,045,910 A * | 4/2000 | Lambrechts | 428/399 |
| 6,235,108 B1 | 5/2001 | Lambrechts | |
| 6,887,309 B2 | 5/2005 | Casanova et al. | |
| 2002/0177003 A1 | 11/2002 | Myrick | |
| 2011/0212343 A1 | 9/2011 | Stahl | |
| 2012/0090507 A1* | 4/2012 | Lambrechts | 106/644 |
| 2012/0097073 A1 | 4/2012 | Lambrechts | |
| 2013/0255540 A1 | 10/2013 | Lambrechts et al. | |
| 2013/0269572 A1 | 10/2013 | Lambrechts et al. | |

FOREIGN PATENT DOCUMENTS

| | | |
|---|---|---|
| DE | 42 2 3804 A1 | 1/1994 |
| DE | 10 2008 034 250 A1 | 1/2010 |
| EP | 0 582 905 A2 | 2/1994 |
| EP | 0 851 957 B1 | 5/2000 |
| EP | 1 282 751 B1 | 9/2006 |
| EP | 1 383 634 B1 | 10/2006 |
| EP | 1 790 792 A2 | 5/2007 |
| EP | 1 840 291 A2 | 10/2007 |
| JP | 6-294017 | 10/1994 |
| WO | WO 84/02732 A1 | 7/1984 |
| WO | WO 93/23343 A1 | 11/1993 |
| WO | WO 99/55980 A1 | 11/1999 |
| WO | WO 2010/078995 A1 | 7/2010 |

OTHER PUBLICATIONS

U.S. Appl. No. 13/377,288, filed Dec. 9, 2011, Lambrechts.

Ravindra K. Dhir, Composite Materials in Concrete Constructions, 2002, 4 pages.

Verband Deutscher Stahlfaserhersteller E. V., Stahlfaserbeton—Stahlfasertypen, Jun. 23, 2006, pp. 1-4.

USPTO Office Action, U.S. Appl. No. 13/377,288, Jan. 27, 2014.

USPTO Office Action, U.S. Appl. No. 13/377,288 May 7, 2014, 3 pages.

USPTO Office Action, U.S. Appl. No. 13/993,894, May 28, 2014, 16 pages.

USPTO Notice of Allowance, U.S. Appl. No. 13/377,288, Jun. 23, 2014, 8 pages.

* cited by examiner

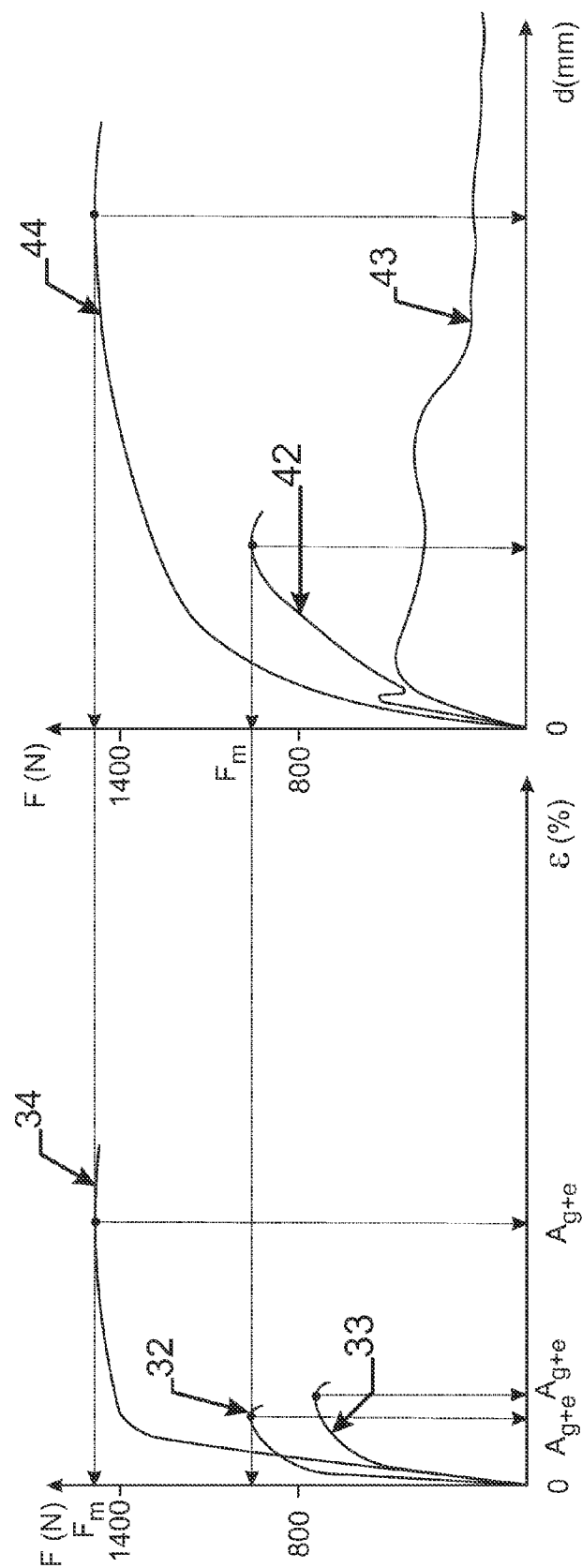

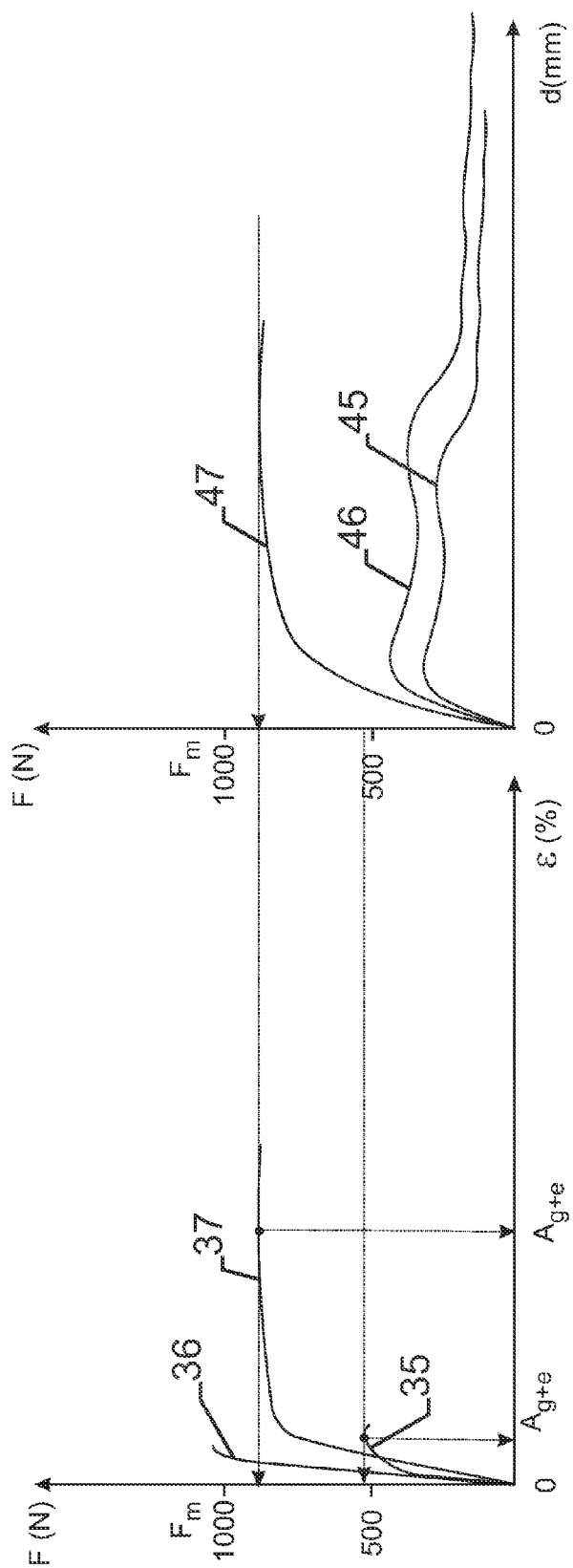

HIGH ELONGATION FIBRE WITH GOOD ANCHORAGE

TECHNICAL FIELD

The invention relates to a new type of steel fibres for concrete or mortar reinforcement. The steel fibres have a high elongation and are provided with anchorage ends allowing to obtain a good anchorage when embedded in the concrete or mortar.

The invention also relates to concrete or mortar structures having such steel fibres.

BACKGROUND ART

It is well-known to reinforce concrete or mortar with steel fibres to improve the quality of the concrete material.

EP-B1-851957 (NV Bekaert SA) teaches a steel fibre with flattened hook shaped ends, whereby the post-crack bending strength of the concrete, reinforced by means of such fibres, is highly improved.

U.S. Pat. No. 4,883,713 (Eurosteel) teaches a steel fibre comprising a cylindrical steel body having conically shaped ends for improving the anchoring feature of the steel fibre into the steel fibre reinforced concrete.

These two cited documents, as well as other documents, teach that the properties of conventional steel fibre concrete can be highly improved thanks to the improved anchoring features of the steel fibres into the steel fibre concrete.

Currently the known prior art steel fibres for concrete reinforcement function very well for improving the service-ability limit state (SLS) of a concrete structure, i.e. they bridge very well the cracks or crack mouth opening displacements (CMOD) up to the typically required 0.5 mm, e.g. CMOD's ranging between 0.1 mm and 0.3 mm, during a typical three point bending test—for the test see European Standard EN 14651 (Test method for metallic fibred concrete, measuring the flexural tensile strength).

In other words, known steel fibres like steel fibres with hook shaped ends and fibres having conically shaped ends function well for limiting the width or growth of cracks up to about 0.5 mm (SLS).

The disadvantage today of these fibres is the relatively low performance at ultimate limit state (ULS). Especially, the ratio between ultimate limit state (ULS) and service-ability limit state (SLS) post-crack strength is relatively low. This ratio is determined by the load value $F_{R,1}$ (CMOD=0.5 mm) and $F_{R,4}$ (CMOD=3.5 mm).

Some prior art fibres do not perform at ULS as they break at CMOD lower than what is required for ULS. Other fibres, like hooked end fibres are designed to be pulled-out. Due to the pull-out, those fibres show a displacement-softening behaviour already for small displacements.

In spite of this low performance at ULS, presently known steel fibres may also be used in so-called structural applications in order to improve the ultimate limit state (ULS). Here the known steel fibres are expected to bear or carry load, instead of or in addition to classical reinforcement, such as rebar, mesh, pre-stressing, and post-tensioning. In order to be effective in such load carrying function, however, these present steel fibres have to be used in huge dosages considerably exceeding normal dosages of 20 kg/m³ to 40 kg/m³. The huge dosages can cause workability problems such as the mixing and placing problems.

DISCLOSURE OF INVENTION

It is an object of the present invention to provide a new type of steel fibres able to fulfil a new function once embedded in concrete or mortar.

It is another object of the present invention to provide steel fibres which are capable of bridging permanently the crack mouth opening displacements greater than 0.5 mm during the three point bending test according to the European Standard EN 14651 (June 2005).

It is an object of the present invention to provide for steel fibres which may advantageously be used in normal dosages for structural applications.

It is another object of the present invention to provide for steel fibres that allow to reduce or to avoid the creep behaviour of concrete structures reinforced with those fibres in the tension zone.

It is a further object to provide steel fibres that allow calculating the stress in the fibre from the strain (or CMOD) not only at SLS, but also at ULS. Traditional steel fibres basically display two mechanisms of working.

The first mechanism is fibre pull-out without any breakage of the fibre, like for the steel fibres with hook shaped ends as for example known from EP-B1-851957 and for some ondulated fibres. In this case, there is no direct relationship between the CMOD and the strain in the fibre.

The second mechanism is fibre failure. In this case, the fibres are well anchored so that only limited fibre pull-out can take place, but due to low strain capacity of the wires where the fibres are made of, the fibres will fail at CMOD's lower than required at ULS. Especially, the ratio between ULS and SLS post-crack strength is relatively low. When fibre failure occurs, there is no direct relationship between CMOD and the strain in the fibre. Fibres according to this invention are fully or almost fully anchored in the concrete or mortar but as the fibres are made of a steel wire having a high failure strain, they do not break before reaching ULS. The ratio ULS/SLS is equal or bigger than 1 for one fibre. For fibres according to this invention, fibre strain (derived from CMOD) is more or less equal to the strain of the wire where the fibres are made of so that the stress in one fibre can be calculated from the strain, unlike traditional fibres.

According to a first aspect of the present invention, there is provided a steel fibre for reinforcing concrete or mortar. The steel fibre has a middle portion and anchorage ends at one or both ends of the middle portion. The middle portion of the steel fibre has a length L, a maximum load capacity $F_m$ (in N) and an elongation at maximum load $A_{g+e}$. A steel fibre according to the present invention, more particularly the middle portion of a steel fibre according to the present invention has an elongation at maximum load that is at least 2.5%.

The steel fibre according to the present invention has an anchorage force in the concrete of the mortar that is at least 90% of the maximum load capacity $F_m$.

The anchorage force is determined by the maximum load that is reached during a pull out test. For this pull out test a steel fibre is embedded with one end in the concrete or mortar. The test is described further in more detail.

Elongation at Maximum Load

Within the context of the present invention, the elongation at maximum load $A_{g+e}$ and not the elongation at fraction $A_t$ is used to characterise the elongation of a steel fibre, more particularly of the middle portion of a steel fibre.

The reason is that once the maximum load has been reached, constriction of the available surface of the steel fibre starts and higher loads are not taken up.

The elongation at maximum load $A_{g+e}$ is the sum of the plastic elongation at maximum load $A_g$ and the elastic elongation.

The elongation at maximum load does not comprise the structural elongation $A_s$ which may be due to the wavy character of the middle part of the steel fibre (if any). In case of a wavy steel fibre, the steel fibre is first straightened before the $A_{g+e}$ is measured.

The elongation at maximum load $A_{g+e}$ of the middle portion of a steel fibre according to the present invention is at least 2.5%.

According to particular embodiments of the present invention, the middle portion of the steel fibre has an elongation at maximum load $A_{g+e}$ higher than 2.75%, higher than 3.0%, higher than 3.25%, higher than 3.5%, higher than 3.75%, higher than 4.0%, higher than 4.25%, higher than 4.5%, higher than 4.75%, higher than 5.0%, higher than 5.25%, higher than 5.5%, higher than 5.75% or even higher than 6.0%.

The high degree of elongation at maximum load $A_{g+e}$ may be obtained by applying a particular stress-relieving treatment such as a thermal treatment to the steel wires where the steel fibres will be made of.

Maximum Load Capacity $F_m$-Tensile Strength $R_m$

A steel fibre according to the present invention, i.e. the middle portion of a steel fibre according to the present invention preferably has a high maximum load capacity $F_m$. The maximum load capacity $F_m$ is the greatest load that the steel fibre withstands during a tensile test.

The maximum load capacity $F_m$ of the middle portion is directly related to the tensile strength $R_m$ of the middle portion as the tensile strength $R_m$ is the maximum load capacity $F_m$ divided by the original cross-section area of the steel fibre.

For a steel fibre according to the present invention, the tensile strength of the middle portion of the steel fibre is preferably above 1000 MPa and more particularly above 1400 MPa, e.g. above 1500 MPa, e.g. above 1750 MPa, e.g. above 2000 MPa; e.g. above 2500 MPa.

The high tensile strength of steel fibres according to the present invention allows the steel fibres to withstand high loads.

A higher tensile strength is thus directly reflected in a lower dosage of the fibres.

Anchorage Force

The anchorage force of a steel fibre provided with anchorage ends embedded in concrete or mortar is determined by a pull out test. More particularly, the anchorage force is corresponding with the maximum load that is reached during a pull out test. The pull out test is explained further in more detail.

The steel fibre according to the present invention offers a very good (almost perfect) anchorage in the concrete or mortar. According to the present invention the anchorage force of a steel fibre in concrete or mortar is at least 90% of the maximum load capacity $F_m$ of the middle portion of the steel fibre.

In some embodiments, the anchorage force is higher than 92%, 95%, 98% or even higher than 99% of the maximum load capacity $F_m$ of the middle portion of the steel fibre.

The high degree of anchorage in concrete will give the reinforced concrete structure more residual strength as 90% or more of the full strength of the steel wire may be used. Indeed, the steel fibres will be prevented from slipping out of the concrete.

The high degree of anchorage in concrete can be obtained in different ways as for example by thickening or enlarging the ends, by cold heading, by flattening the steel fibres, by making pronounced hooks to the ends of the steel fibres, by ondulating the ends or by combinations of this.

The anchorage ends are for example thickened anchorage ends, enlarged anchorage ends, cold headed anchorage ends, flattened anchorage ends, bent anchorages ends, ondulated anchorage ends or any combination thereof.

The mechanism why some anchorage ends perform better than other anchorage ends is not fully understood and the degree of anchorage can not be predicted by for example mathematical modelling. Therefore, according to the present invention it is proposed to determine the anchorage force of a steel fibre by embedding the steel fibre provided with an anchorage end in concrete or mortar and by subjecting the steel fibre to a pull out test (load displacement test). If the anchorage force is at least 90% of the maximum load capacity $F_m$, the steel fibre meets the requirements of the present invention with respect to anchorage.

The pull out test comprises the following steps:
embedding a steel fibre according to the present invention with one of its anchorage ends in said concrete or mortar, preferably in a block of concrete or mortar. Part of the middle portion of the steel fibre is thereby embedded in the concrete or mortar (=embedded part of the middle portion of the steel fibre) and part of the middle portion of the steel fibre is protruding out of the concrete or mortar (=protruding part of the middle portion of the steel fibre).

fixing clamps on said protruding part of said middle portion of said steel fibre;

exercising a displacement on said clamps.

By this test a load-elongation curve is recorded.

In the pull out test one of the anchorage ends of the steel fibre is fully embedded in the concrete or mortar.

The embedded part of the middle portion of the steel fibre has a length $L_{middle\ portion\ embedded}$ or $L_{MP\ emb}$.

The protruding part of the middle portion till the clamps has a length $L_{middle\ portion\ protruding\ clamps}$ or $L_{MP\ pr\ clamps}$.

The sum of the length $L_{MP\ emb}$ and $L_{MP\ pr\ clamps}$ is defined as the length of the middle portion till the clamps $L_{middle\ portion\ clamps}$ or $L_{MP\ clamps}$.

Preferably, the steel fibre is embedded in a block of concrete or mortar of 50×50×50 mm, 60×60×50 mm or 80×80×60 mm.

$L_{middle\ portion\ embedded}$ is preferably at least 15 mm.

The steel fibres according to the present invention allow in the pull out test at the maximum load that can be obtained during this pull out test an absolute displacement of $x*L_{middle\ portion\ clamps}/100$, with x being at least 2.5. Preferably, x is at least equal to the elongation at maximum load $A_{g+e}$.

In a preferred embodiment, the steel fibres according to the present invention allow at maximum load in the pull out test an absolute displacement of at least $4*L_{middle\ portion\ clamps}/100$, of at least $5*L_{middle\ portion\ clamps}/100$ or of at least $6*L_{middle\ portion\ clamps}/100$.

Because of the high ductility or high elongation of the steel fibres according to the present invention, the fibres will not break at CMOD's above 1.5 mm, above 2.5 mm or above 3.5 mm in the three point bending test according to EN 14651.

Next to the high elongation at maximum load $A_{g+e}$, the steel fibres according to the present invention are also characterised by a high degree of anchorage. As mentioned above, the high degree of anchorage will avoid pull-out of the fibres. The high degree of anchorage combined with the high elongation at maximum strength will avoid pull-out of the fibres and will avoid fibre failure.

The high tensile strength $R_m$ of the steel fibre according to the present invention allows the steel fibre to withstand high loads. The high degree of anchorage combined with the high tensile strength allows that better use is made of the tensile strength after the occurrence of cracks.

Therefore a higher tensile strength is directly reflected in a lower dosage of the fibres, necessary in the conventional concrete.

Pull-out, or fibre failure due to low maximum strain capacity of the steel fibre, are time depending phenomena, and govern the creep behaviour of a structure in tension. Lower creep behaviour of concrete reinforced with steel fibres according to the present invention is expected as these steel fibres do not pull-out and do not break prematurely.

The steel fibres, more particularly the middle portion of the steel fibers typically have a diameter D ranging from 0.10 mm to 1.20 mm. In case the cross-section of the steel fibre and more particularly of the middle portion of the steel fibre is not round, the diameter is equal to the diameter of a circle with the same surface area as the cross-section of the middle portion of the steel fibre.

The steel fibres; more particularly the middle portion of the steel fibers typically have a length to diameter ratio L/D ranging from 40 to 100.

The middle portion of the steel fibre can be straight or rectilinear; or can be wavy or ondulated.

According to a second aspect of the present invention, there is provided a concrete structure comprising steel fibres according to the present invention.

The concrete structure has an average post crack residual strength at ULS exceeding 3 MPa, e.g. more than 4 MPa, e.g. more than 5 MPa, 6 MPa, 7 MPa, 7.5 MPa.

The dosage of steel fibres in the concrete structure is preferably but not necessarily less than 80 kg/m³, preferably less than 60 kg/m³. The dosage of steel fibres in concrete may range from typically from 20 kg/m³ to 50 kg/m³, e.g. from 30 kg/m³ to 40 kg/m³.

Preferred concrete structures have an average post crack residual strength at ULS exceeding 5 MPA with a dosage of said steel fibres less than 40 kg/m³.

According to a third aspect of the present invention, the use of steel fibres as described above for load carrying structures of concrete is provided.

BRIEF DESCRIPTION OF FIGURES IN THE DRAWINGS

Figure 2:
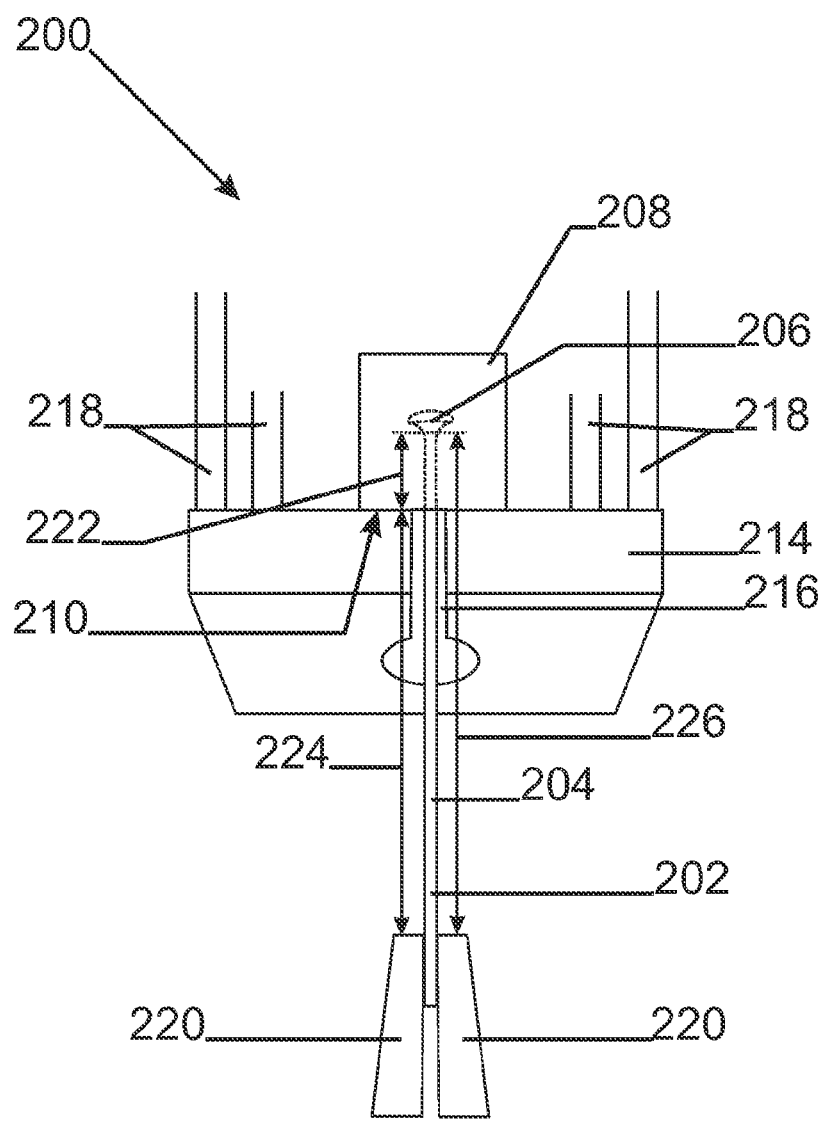
Figure 5A:
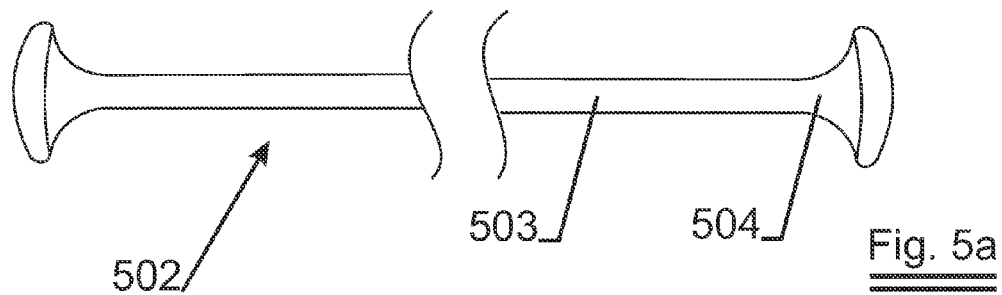
Figure 5B:
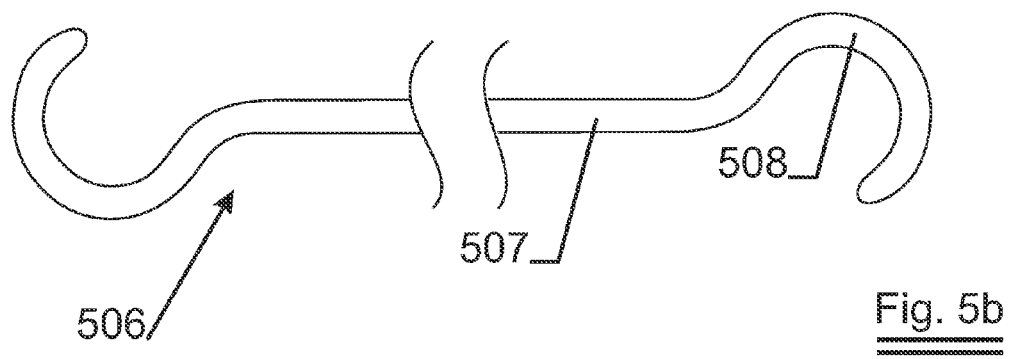
Figure 5C:
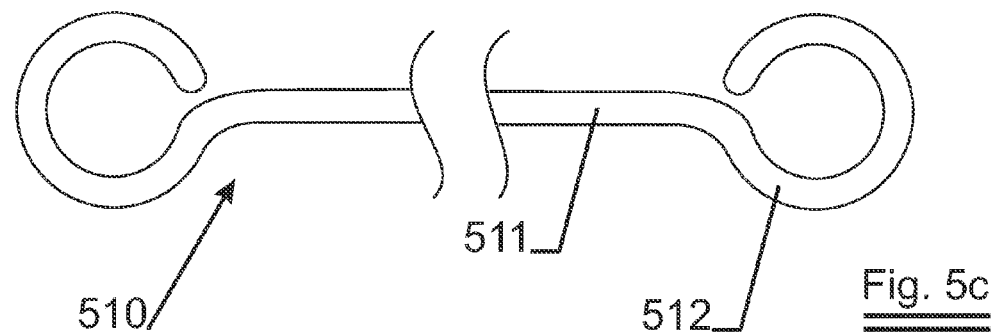

The invention will now be described into more detail with reference to the accompanying drawings wherein
FIG. 1 illustrates a tensile test (load-strain test) of a steel fibre;
FIG. 2 illustrates a pull-out test (load-displacement test) of a steel fibre embedded in concrete or mortar;
FIG. 3a and FIG. 4a show load-strain curves of two prior art steel fibres and one steel fibre according to the present invention;
FIG. 3b and FIG. 4b show load-displacement curves of two prior art steel fibers and one steel fibre according to the present invention;
FIG. 5a, FIG. 5b and FIG. 5c are illustrations of steel fibres provided with anchorage ends according to the present invention.

MODE(S) FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The following terms are provided solely to aid in the understanding of the inventions.
Maximum load capacity ($F_m$): the greatest load which the steel fibre withstands during a tensile test;
Elongation a maximum load (%): increase in the gauge length of the steel fibre at maximum force, expressed as a percentage of the original gauge length;
Elongation at fracture (%): increase in the gauge length at the moment of fracture expressed as a percentage of the original gauge length;
Tensile strength ($R_m$): stress corresponding to the maximum load ($F_m$);
Stress: force divided by the original cross-sectional area of the steel fibre;
Dosage: quantity of fibres added to a volume of concrete (expressed in kg/m³).

To illustrate the invention a number of different steel fibres, prior art steel fibres and steel fibres according to the present invention are subjected to a number of different tests:
a tensile test (load-strain test); and
a pull-out test (load-displacement test).

The tensile test is applied on the steel fibre, more particularly on the middle portion of the steel fibre. Alternatively, the tensile test is applied on the wire used to make the steel fibre.

The tensile test is used to determine the maximum load capacity $F_m$ of the steel fibre and to determine the elongation at maximum load $A_{g+e}$.

The pull-out test is applied on the steel fibre embedded with one anchorage end in the concrete or mortar. The pull out test is used to measure the anchorage force of a steel fibre in concrete and mortar and to determine the absolute displacement of the steel fibre embedded in the concrete or mortar.

The tests are illustrated in FIG. 1 and FIG. 2 respectively.

FIG. 1 shows a test set up 60 for measuring the elongation of steel fibres adapted for concrete reinforcement. The anchorage ends (for example the enlarged or hook shaped ends) of the steel fibre to be tested are cut first. The remaining middle portion 14 of the steel fibre is fixed between two pairs of clamps 62, 63. Through the clamps 62, 63 an increasing tensile force F is exercised on the middle portion 14 of the steel fibre. The displacement or elongation as a result of this increasing tensile force F is measured by measuring the displacement of the grips 64, 65 of the extensometer. $L_1$ is the length of the middle part of the steel fibre and is e.g. 50 mm, 60 mm or 70 mm. $L_2$ is the distance between the clamps and is e.g. 20 mm or 25 mm. $L_3$ is the extensometer gauge length and is minimum 10 mm, e.g. 12 mm, e.g. 15 mm. For an improved grip of the extensometer to the middle portion 14 of the steel fibre, the middle portion of the steel fibre can be coated or can be covered with a thin tape to avoid slippery of the extensometer over the steel fibre. By this test a load-elongation curve is recorded.

The percentage total elongation at maximum load is calculated by the following formula:

$$A_{g+e} = \frac{\text{extension at maximum load}}{\text{extensometer gauge length } L_3} \times 100$$

With the help of the test set up 60, a number of different wires are tested as to maximum load capacity $F_m$ (breaking load), tensile strength $R_m$ and total elongation at maximum load $A_{g+e}$. In total ten wires are tested: nine prior art wires and one invention wire. Five tests per specimen have been done. Table 1 summarizes the results.

TABLE 1

| Fibre type | Diameter (mm) | $F_m$ (N) | $R_m$ (MPa) | $A_{g+e}$ (%) |
|---|---|---|---|---|
| Prior art 1 | 0.90 | 879 ± 8 | 1382 ± 12 | 1.37 ± 0.07 |
| Prior art 2 | 1.0 | 911 ± 14 | 1160 ± 18 | 1.86 ± 0.24 |
| Prior art 3 | 1.0 | 1509 ± 12 | 1922 ± 15 | 2.36 ± 0.19 |
| Prior art 4 | 1.0 | 873 ± 10 | 1111 ± 13 | 1.95 ± 0.21 |
| Prior art 5 | 1.0 | 1548 ± 15 | 1972 ± 19 | 1.99 ± 0.27 |
| Prior art 6 | 1.0 | 1548 ± 45 | 1971 ± 58 | 2.33 ± 0.29 |
| Prior art 7 | 0.75 | 533 ± 19 | 1206 ± 43 | 2.20 ± 0.24 |
| Prior art 8 | 0.9 | 751 ± 29 | 1181 ± 46 | 2.16 ± 0.13 |
| Prior art 9 | 0.77 | 1051 ± 20 | 2562 ± 44 | 1.88 ± 0.15 |
| Invention wire | 0.89 | 1442 ± 3 | 2318 ± 4 | 5.06 ± 0.32 |

Only the invention wire has an elongation at maximum load exceeding 2.5%.

FIG. 2 illustrates a test set up 200 for measuring the anchorage of a steel fibre 202 in concrete. The steel fibre 202 has a middle portion 204 and anchorage ends 206. The steel fibre 202 is anchored with one of its anchorage ends 206 in a concrete cube 208. The concrete cube 208 is for example a cube of 50×50×50 mm. Alternatively, the cube 208 is a cube of 60×60×50 mm or a cube of 80×80×60 mm. The cube 208 is for example made of conventional concrete.

The steel fibre 202 is embedded in the centre of one face 210 of the cube 208 perpendicular to that face 210. The anchorage end 206 is thereby fully embedded in the concrete cube.

The length of the middle portion of the steel fibre that is embedded in the concrete or mortar is defined as $L_{middle\ portion\ embedded}$ or $L_{MP\ emb}$ and is represented by 222.

The length of the middle portion of the steel fibre that is not embedded in the concrete or the mortar till the clamps is defined as $L_{middle\ portion\ protruding\ clamps}$ or $L_{MP\ pr\ clamps}$ and is represented by 224.

The sum of the length $L_{MP\ emb}$ and $L_{MP\ pr\ clamps}$ is defined as the length of the middle portion till the clamps $L_{middle\ portion\ clamps}$ or $L_{MP\ clamps}$ and is represented by 226.

$L_{middle\ portion\ embedded}$ is preferably at least 15 mm.

The cube 208 is then laid on a platform 214 with a central opening 216 throught with the steel fibre 202 extends.

The platform 214 is held by bars 218 which build a cage around the cube 208. The other end of the steel fibre 202 is cut away and is fixed in clamps 220. A displacement is exercised on the steel fibre 202 until steel fibre 202 breaks or is pulled out of the cube 208. A force displacement or load displacement diagram is recorded.

FIG. 3a shows a load-strain curve of three different steel fibres having a diameter of 0.90 mm:
Load-strain curve 32 is the load-strain curve of a prior art wire, more particularly of prior art wire 1 of table 1;
Load-strain curve 33 is the load-strain curve of a second prior art wire, more particularly of prior art wire 8 of table 1;
Load-strain curve 34 is the load-strain curve of a wire used for a steel fibre according to the present invention, more particularly the invention wire of table 1.

The load-strain curves are obtained by subjecting the steel fibres to a test as described in FIG. 1.

Load-strain curve 32 and load-strain curve 33 are similar.

Load-strain curve 32 shows a maximum load capacity $F_m$ of 879 N. This maximum load capacity $F_m$ is equivalent to a maximum tensile strength $R_m$ of about 1382 MPa. Load-strain curve 32 furthermore shows an elongation at maximum load $A_{g+e}$ of 1.37%.

Load-strain curve 33 shows a maximum load capacity $F_m$ of 751 N. This maximum load capacity $F_m$ is equivalent to a maximum tensile strength $R_m$ of about 1181 MPa. Load-strain curve 33 shows an elongation at maximum load $A_{g+e}$ of 2.16%.

When the load-strain curve 34 of a steel fibre according to the present invention is compared with the load-strain curves 32 and 33 of the prior art steel fibres two differences are to be noticed:

First of all, the maximum load capacity $F_m$ is greater than 1400 Newton, i.e. much greater than the maximum load capacity $F_m$ of the prior art fibre of curve 32 and of curve 33.

Secondly, the elongation at maximum load $A_{g+e}$ is also much greater than the elongation at maximum load $A_{g+e}$ of the prior art fibre of curve 32 and of the prior art fibre of curve 33. The elongation at maximum load $A_{g+e}$ of the steel fibre according to the present invention is greater than 2.5%, or even greater than 3.0% or 4.0%, more particularly 5%.

FIG. 3b shows the load-displacement curves of the fibres tested in the load-strain test of FIG. 3a:
Load-displacement curve 42 is the load-displacement curve of a first prior art steel fibre, more particularly of a steel fibre made of prior art wire 1 of table 1, the steel fibre is provided with nail's heads as anchorage ends at both ends.
Load-displacement curve 43 is the load-displacement curve of a second prior art steel fibre more particularly a steel fibre made of prior art wire 8 of table 1, the steel fibre is provided with hook shaped ends at both ends;
Load-displacement curve 44 corresponds with the load-strain curve of a fibre according to the present invention, more particularly a steel fibre made of the invention wire of table 1, the steel fibre is provided with nail's heads as anchorage ends at both ends.

During the pull out test the first prior art steel fibre (curve 42) shows a maximum load (=anchorage force) that is about the same as the maximum load capacity $F_m$ of the corresponding wire as determined in FIG. 3a (curve 32). This is an indication of a good anchorage of the fibre in concrete. The maximum load capacity $F_m$ of the fibre in concrete is reached at relatively small displacements. However, the first prior art fibre fails at low CMOD, much lower than the CMOD required for ULS because of fracture of the fibre.

The second prior art fibre (curve 43) shows a completely other behaviour. Curve 43 relates to the pull-out behaviour of a prior art fibre with hook shaped ends. The hook shaped ends are designed to be pulled out of the concrete.

During the pull out test the second prior art steel fibre (curve 43) shows a maximum load that is far below the maximum load capacity $F_m$ of the corresponding wire as determined in FIG. 3a (curve 33). When the steel fiber is further loaded in the pull-out test, the hooks start to deform to allow the steel fibre to slip out of the concrete. This results in higher displacements but at decreasing loads. Consequently the second prior art steel fibre with hook shaped ends do not make use of the full tensile strength of the steel. The fibres are pulled out without fracture of the fibre.

Looking at curve 44, the maximum load obtained during a pull out test is about the same as the maximum load capacity $F_m$ of the corresponding wire as determined in FIG. 3a (curve 44). This is an indication of the good anchorage force of the steel fibre according to the present invention in concrete.

The steel fibre of curve 44 allows in the pull out test at maximum load obtained in the pull out test an absolute displacement of $x*L_{middle\ portion\ clamps}/100$, with x being at least 2.5. Preferably x is at least equal to the elongation at maximum load $A_{g+e}$.

In a preferred embodiment, the steel fibres according to the present invention allow at maximum load in the pull out test an absolute displacement of at least $4*L_{middle\ portion\ clamps}/100$, of at least $5*L_{middle\ portion\ clamps}/100$ or of at least $6*L_{middle\ portion\ clamps}/100$.

The steel fibre according to the present invention will not break at CMOD's above 1.5 mm, above 2.5 mm or above 3.5 mm in the three point bending test according to EN 14651.

Because of the high tensile strength, the high elongation and the good anchorage of the steel fibre the steel fibre once loaded will make use of almost its full tensile strength without being broken or without being pulled out. Consequently, lower dosages can be used.

Furthermore, concrete reinforced with this type of steel fibres will show lower creep.

FIG. 4a shows a load-strain curve of three different steel fibres having a diameter of respectively 0.75 mm, 0.77 mm and 0.70 mm.

Load-strain curve 35 is the load-strain curve of a prior art wire, more particularly of prior art wire 7 of table 1;

Load-strain curve 36 is the load-strain curve of a second prior art wire, more particularly of prior art wire 9 of table 1;

Load-strain curve 37 is the load-strain curve of a wire used for a steel fibre according to the present invention.

The load-strain curves are obtained by subjecting the steel fibres to a test as described in FIG. 1.

Load-strain curve 35 shows a maximum load capacity $F_m$ of 533 N. This maximum load capacity $F_m$ is equivalent to a maximum tensile strength $R_m$ of about 1206 MPa. Load-strain curve 35 furthermore shows an elongation at maximum load $A_{g+e}$ of 2.20%.

Load-strain curve 36 shows a maximum load capacity $F_m$ of 1051 N. This maximum load capacity $F_m$ is equivalent to a maximum tensile strength $R_m$ of about 2562 MPa. The wire is made of steel having a high carbon content. This is explaining the high maximum load capacity $F_m$. Load-strain curve 36 shows an elongation at maximum load $A_{g+e}$ of 1.88%. Load-strain curve 37 shows a maximum load capacity $F_m$ of 890 N. This maximum load capacity $F_m$ is equivalent to a maximum tensile strength $R_m$ of about 2313 MPa. Load-strain curve 35 furthermore shows an elongation at maximum load $A_{g+e}$ of more than 4%, for example 5%. When the load-strain curve 37 of the invention wire is compared with the load-strain curves 35 and 36 of the prior art wires, one observes that the maximum load capacity $F_m$ of the invention wire is between the maximum load capacity $F_m$ of the two prior art wires;

the elongation at maximum load $A_{g+e}$ of the invention wire is much greater than the elongation at maximum load $A_{g+e}$ of the two prior art wires.

FIG. 4b shows the load-displacement curves of the fibres tested in the load-strain test of FIG. 4a:

Load-displacement curve 45 is the load-displacement curve of a prior art steel fibre, more particularly of a steel fibre made of prior art wire 7 of table 1, the steel fibre is provided with hook shaped ends.

Load-displacement curve 46 is the load-displacement curve of another prior art steel fibre more particularly a steel fibre made of prior art wire 9 of table 1, the steel fibre is provided with hook shaped ends;

Load-displacement curve 44 corresponds with the load-strain curve of a fibre according to the present invention, more particularly a steel fibre made of the invention wire of table 1, the steel fibre is provided with nail's heads as anchorage ends.

During the pull out test the first prior art steel fibre (curve 45) shows a maximum load that is substantially lower than the maximum load capacity $F_m$ of the corresponding wire as determined in FIG. 4a (curve 35).

Curve 45 shows the pull-out behaviour of a prior art fibre with hook shaped ends. When the steel fibre is loaded in the pull-out test, the hooks start to deform to allow the steel fibre to slip out of the concrete. This results in higher displacements at decreasing loads. Consequently the prior art fibre with hook shaped ends do not make use of the full tensile strength of the steel. The fibres are pulled out without fracture of the fibres.

Curve 46 is very similar to curve 44. The maximum load obtained in the pull out test of curve 46 is somewhat higher than the maximum load of curve 45. Similar to curve 45, the maximum load obtained in the pull out test of curve 46 is much lower than the maximum load capacity $F_m$ of the corresponding wire as determined in FIG. 4a (curve 36).

When the steel fiber is further loaded in the pull-out test, the hooks start to deform to allow the steel fibre to slip out of the concrete. This results in higher displacements but at decreasing loads. Consequently the prior art steel fibre with hook shaped ends do not make use of the full tensile strength of the steel. The fibres are pulled out without fracture of the fibre.

Looking at curve 47, the maximum load obtained during a pull out test is about the same as the maximum load capacity $F_m$ of the corresponding wire as determined in FIG. 4a (curve 37). This is an indication of the good anchorage force of the steel fibre according to the present invention in concrete. Although the middle portion of the steel fibre of curve 46 has a higher load capacity $F_m$ than the middle portion of the steel fibre of curve 47, the maximum load obtained during a pull out test of the steel fibre of curve 47 is higher than the maximum load obtained during a pull out test of the steel fibre of curve 46.

The steel fibre of curve 47 makes use of almost its full tensile strength without being broken or without being pulled out whereas the steel fibre of curve 46 will slip out without making use of its strength.

The steel fibre of curve 47 allows in the pull out test at maximum load in the pull out test an absolute displacement of $x*L_{middle\ portion\ clamps}/100$, with x being at least 2.5. Preferably x is at least equal to the elongation at maximum load $A_{g+e}$ In a preferred embodiment, the steel fibres according to the present invention allow at maximum load in the pull out test an absolute displacement of at least $4*L_{middle\ portion\ clamps}/100$, of at least $5*L_{middle\ portion\ clamps}/100$ or of at least $6*L_{middle\ portion\ clamps}/100$.

FIG. 5a, FIG. 5b and FIG. 5c show different embodiments of steel fibres according to the present invention providing a good anchorage force once the steel fibre is embedded in concrete or mortar.

It is not fully understood why some anchorage ends perform better than other anchorage ends. Therefore, according to the present invention it is proposed to determine the anchorage force of a steel fibre by embedding the steel fibre provided with its anchorage ends in concrete or mortar and by subjecting the steel fibre to a pull out test (load displacement test). If the anchorage force is at least 90% of the maximum load capacity $F_m$, the steel fibre meets the requirements of the present invention.

FIG. 5a shows a steel fibre 502 having a middle portion 503 provided with anchorages ends 504. The anchorage ends 504 are enlarged ends at both sides of the middle portion 503. These enlarged ends 504 are comparable to a nail's head. In the embodiment shown in FIG. 5a, the nail's head is round. Although this is not a limitation. Nail's heads having another shape such as square heads or rectangular heads are also suitable.

FIG. 5b shows another steel fibre 506 having a middle portion 507 provided with anchorage ends 508 at both ends of the middle portion 507. The anchorage ends 508 are hooks.

FIG. 5c shows a further embodiment of a steel fibre 510 according to the present invention providing an anchorage above 90% once embedded in concrete or mortar.

The steel fibre 510 has a middle portion 511 provided with anchorage ends 512 at both ends of the middle portion 511.

The anchorage ends 512 have the shape of a closed or substantially closed hook.

As a matter of example, steel fibres according to the invention may be made as follows.

Starting material is a wire rod with a diameter of e.g. 5.5 mm or 6.5 mm and a steel composition having a minimum carbon content of 0.50 percent by weight (wt %), e.g. equal to or more than 0.60 wt %, a manganese content ranging from 0.20 wt % to 0.80 wt %, a silicon content ranging from 0.10 wt % to 0.40 wt %. The sulphur content is maximum 0.04 wt % and the phosphorous content is maximum 0.04 wt %.

A typical steel composition comprises 0.725% carbon, 0.550% manganese, 0.250% silicon, 0.015% sulphur and 0.015% phosphorus. An alternative steel composition comprises 0.825% carbon, 0.520% manganese, 0.230% silicon, 0.008% sulphur and 0.010% phosphorus. The wire rod is cold drawn in a number of drawing steps until its final diameter ranging from 0.20 mm to 1.20 mm.

In order to give the steel fibre its high elongation at fracture and at maximum load, the thus drawn wire may be subjected to a stress-relieving treatment, e.g. by passing the wire through a high-frequency or mid-frequency induction coil of a length that is adapted to the speed of the passing wire. It has been observed that a thermal treatment at a temperature of about 300° C. for a certain period of time results in a reduction of the tensile strength of about 10% without increasing the elongation at fracture and the elongation at maximum load. By slightly increasing the temperature, however, to more than 400° C., a further decrease of the tensile strength is observed and at the same time an increase in the elongation at fracture and an increase in the elongation at maximum load.

The wires may or may not be coated with a corrosion resistant coating such as a zinc or a zinc alloy coating, more particularly a zinc aluminium coating or a zinc aluminium magnesium coating. Prior to drawing or during drawing the wires may also be coated with a copper or copper alloy coating in order to facilitate the drawing operation.

The stress-relieved wires are then cut to the appropriate lengths of the steel fibres and the ends of the steel fibres are given the appropriate anchorage or thickening. Cutting and hook-shaping can also be done in one and the same operation step by means of appropriate rolls.

The thus obtained steel fibres may or may not be glued together according to U.S. Pat. No. 4,284,667.

In addition or alternatively, the obtained steel fibres may be put in a chain package according to EP-B1-1383634 or in a belt like package such as disclosed in European patent application with application number 09150267.4 of Applicant.

The invention claimed is:

1. A steel fibre for reinforcing concrete or mortar, said steel fibre having a middle portion and anchorage ends at one or both ends of said middle portion, said middle portion having a maximum load capacity $F_m$ and having an elongation at maximum load $A_{g+e}$, said elongation at maximum load $A_{g+e}$ being at least 4.0%, said steel fibre having an anchorage force in said concrete or said mortar of at least 90% of said maximum load capacity $F_m$, said anchorage force being the maximum load obtained during a pull out test of a steel fibre embedded with one of said anchorage ends in said concrete or said mortar, wherein said anchorage ends are thickened anchorage ends, bent anchorage ends, undulated anchorage ends or combinations thereof, and wherein said middle portion has a length of at least 50 mm.

2. A steel fibre according to claim 1, wherein said middle portion of said steel fibre has a tensile strength $R_m$ of at least 1000 MPa.

3. A steel fibre according to claim 1, wherein said middle portion has a tensile strength $R_m$ of at least 1400 MPa.

4. A steel fibre according to claim 1, wherein said middle portion of said steel fibre has an elongation at maximum load $A_{g+e}$ of at least 6%.

5. A steel fibre according to claim 4, wherein said middle portion has a tensile strength $R_m$ of at least 1400 MPa.

6. A steel fibre according to claim 1 wherein said steel fibre is in a stress-relieved state.

7. A steel fibre according to claim 1 wherein said middle portion of said steel fibre has a diameter ranging from 0.1 mm to 1.20 mm.

8. A steel fibre according to claim 1 wherein said middle portion of said steel fibre has a length to diameter ratio L/D ranging from 40 to 100.

9. A concrete structure comprising steel fibres according to claim 1.

10. A concrete structure according to claim 9, wherein said concrete structure has an average post crack residual strength at ULS exceeding 5 MPa with a dosage of said steel fibres less than 40 kg/m$^3$.

11. A steel fibre according to claim 6, wherein said middle portion has a tensile strength Rm of at least 1400 MPa.

12. A steel fibre according to claim 1, wherein said middle portion of said steel fibre has a diameter ranging from 0.7 mm to 1.20 mm.

\* \* \* \* \*